United States Patent
Imanishi et al.

(10) Patent No.: US 7,140,344 B2
(45) Date of Patent: Nov. 28, 2006

(54) AIR CLEANER

(75) Inventors: Takashi Imanishi, Tokyo (JP);
Tomonori Oyamada, Tokyo (JP);
Yoshiyuki Akao, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 11/083,082

(22) Filed: Mar. 18, 2005

(65) Prior Publication Data
US 2005/0217632 A1    Oct. 6, 2005

(30) Foreign Application Priority Data
Mar. 19, 2004 (JP) ............... 2004-081349

(51) Int. Cl.
*G01F 1/68* (2006.01)

(52) U.S. Cl. ............... 123/198 E; 123/184.21

(58) Field of Classification Search ............ 123/198 E, 123/184.21
See application file for complete search history.

(56) References Cited

U.S. PATENT DOCUMENTS 6,167,862 B1 * 1/2001 Powell et al. ........... 123/198 E
6,899,081 B1 * 5/2005 Bielicki et al. ............. 123/402

FOREIGN PATENT DOCUMENTS

JP      09 269251       10/1997

* cited by examiner

*Primary Examiner*—Stephen K. Cronin
*Assistant Examiner*—Jason Benton
(74) *Attorney, Agent, or Firm*—Jacobson Holman PLLC

(57) ABSTRACT

The outlet duct extending outward from the air cleaner case is also extended inward into the air cleaner case with the same inner diameter such that the length of the part extending into the air cleaner is 10% to 25% of the axial length of the air cleaner element. By this, the distance from the opening of the outlet duct in the air cleaner case to the air flow sensor located in a downstream zone can be increased in an automobile engine, turbulence in the intake air flow can be considerably weakened at the air flow sensor, and air flow measurement not fluctuating widely can be obtained with an air flow measuring device having the same calibration program even when an air cleaner element of different type, i.e. of single type or double type, is used in an air cleaner case of the same design.

6 Claims, 2 Drawing Sheets

AIR CLEANER

BACKGROUND OF THE INVENTION

1. Field of the Invention

The present invention relates to an air cleaner of automobile engine, specifically to structure of an air cleaner case in the case the intake air flow of the engine is measured in a zone downstream from the air cleaner.

2. Description of the Related Art

In an automobile engine, it has become necessary to control the flow of EGR (Exhaust Gas Recirculation) gas in correspondence with the intake air flow in order to meet upcoming regulation of exhaust gas. To deal with this, an air flow sensor is provided downstream of the air cleaner to measure the intake air flow.

Turbulence and drift in the intake air flow changes when the shape of the air cleaner case and duct are changed, and noise occurs in the output of the flow sensor, causing inaccurate measurement of the intake air flow.

There is a case the air cleaner element is different according to the use of the engine. A single type element is used for the air cleaner of a cargo truck and bus, and a double type element is used for the air cleaner of a dump truck which runs many hours in dusty districts. Air cleaner cases and intake air flow measuring apparatuses of the same type are used in many of these cases. FIG. 4 and FIG. 5 show respectively when a single type element and a double type element is used in an air cleaner case of the same design.

In FIG. 4 and FIG. 5, reference numeral 1 is an air cleaner case, and 2' is an outlet duct extending outward from the air cleaner case. The duct 2' is connected to the intake pipe of an engine not shown in the drawings. Reference numeral 3 is a single type element, 4(4a and 4b) is a double type element, and 5 is a case cover to be attached to the air cleaner case 1. The air cleaner element 3 and 4 are formed to be cylindrical and held in the air cleaner case 1 by means of the case cover 5.

An air flow sensor 6 is located in the duct 2' downstream from the air cleaner case, i.e. at a position nearer to said intake pipe not shown in the drawing. Air is sucked through an inlet duct 7 into the pre-clean room 8 in the air cleaner case 1, flows through the element 3 or 4 to the post-clean room 9 in the air cleaner case 1, and flows toward the said intake pipe through the outlet duct 2'.

In the case the air cleaner case 1 of the same design is used for the single type element 3 and for the double type element 4, a radial step $G_1$ is caused between the inner surface of the duct 2' and that of the element 3 when the single type element 3 is used as shown in FIG. 4, and a radial step $G_2$ is caused between them when the double type element 4 is used as shown in FIG. 5. When there is a radial step between the inner surface of the duct 2' and that of the element like these, turbulence is generated in the air flow at the radial step.

The turbulence propagates toward downstream, which does not disappear until it reaches fairly far from the radial step.

However, it is impossible in the case of an automobile engine to secure distance A between the entrance to the duct 2' and the center 6a of the air flow sensor 6 long enough for the turbulence to disappear because of restricted engine mounting space, and it is unavoidable to locate the air flow sensor 6 at a zone where measurements is influenced by the turbulence.

There has been disclosed in JP9-269251A an air flow measuring device for reducing noise in the output of an air flow sensor, in which a secondary air flow passage less influenced by disturbance and drift in the intake air flow is formed in addition to a main air passage and the air flow sensor is located in the secondary air flow passage.

However, flow resistance inevitably increases with the flow measuring device having such a secondary flow passage.

Concerning the accuracy of flow measurements, it is possible to correct the measurements on the basis of experimental relation between the measured and actual flow rate obtained beforehand. However, in this case, two control units of which one is imputed with a calibration formula for a single type element and the other is inputted with a calibration formula for a double type element must be prepared, which causes an increase in cost and brings about additional parts management work.

SUMMARY OF THE INVENTION

The object of the present invention is therefore to provide an air cleaner constructed so that a common control unit can be applied even when different types of air cleaner element are used for an air cleaner case of the same design.

The object is achieved by composing the air cleaner case such that an outlet duct extends with the same inner diameter outward from and inward into the air cleaner case. It is preferable that said outlet duct is extended inward into said air cleaner case by a length of 10% to 25% of the inside length of the air cleaner case corresponding to the axial length of the air cleaner element inserted therein.

By extending the outlet duct inward into the air cleaner case, the distance from the opening of the outlet duct in the air cleaner case to the position of an air flow sensor can be increased. Accordingly, turbulence in air flow in a zone where the air flow sensor located downstream can be considerably weakened, and difference in flow measurements between the value measured when a single type element is used and the value measured when a double type element is used can be reduced. The length of the part of the duct extended into the air cleaner case should be limited, because when said length is too large, the area of the element where the intake air passes through to the post-clean room of the air cleaner is reduced and the resistance for the air to pass through the element increases, which causes increased intake resistance resulting in decreased engine performance. According to experiments, it was found suitable to extend the outlet duct into the air cleaner case by a length of 10% to 25% of the inside length of the air cleaner case corresponding to the axial length of the air cleaner element inserted therein.

The result of the experiments showed that variations in flow measurements was reduced to ±3.8% in the case the outlet duct is extended into the air cleaner case from ±6.8% in the case of prior art shown in FIG. 3 and FIG. 4.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
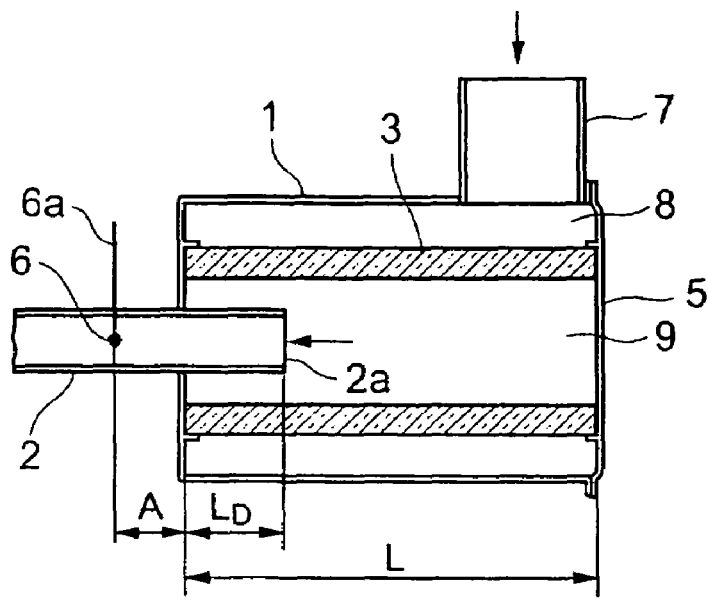
FIG. 1 is a schematic representation of the air cleaner according to the present invention when a single type element is inserted in the air cleaner.
Figure 2:
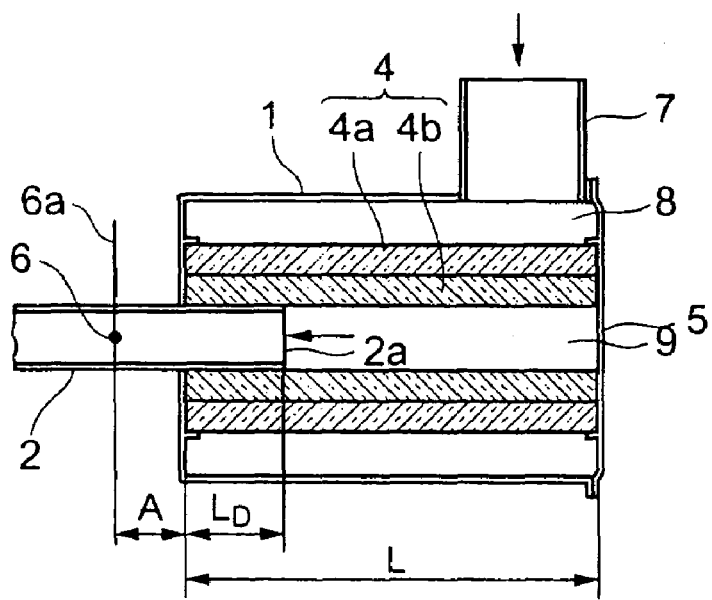
FIG. 2 is a schematic representation of the air cleaner according to the present invention when a double type element is inserted in the air cleaner.
Figure 3:
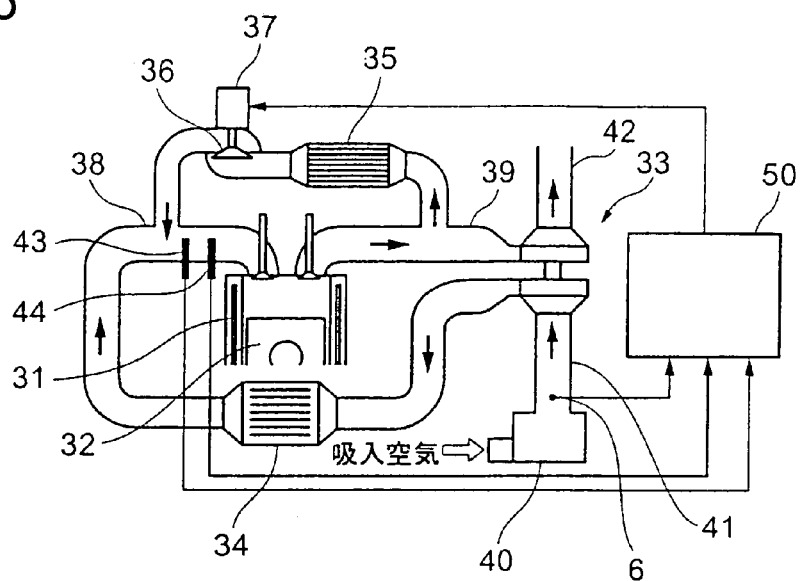
FIG. 3 is a schematic representation of the control system of air supply and exhaust of an engine equipped with the air cleaner of the invention.

FIG. 1 is a schematic representation of the air cleaner according to the present invention when a single type element is inserted in the air cleaner, and FIG. 2 is a schematic representation of the air cleaner according to the present invention when a double type element is inserted in the air cleaner. FIG. 3 is a schematic representation of the control system of air supply and exhaust of an engine equipped with the air cleaner of the invention.

Referring to FIG. 1, reference numeral 1 is an air cleaner case, 2 is an outlet duct, 3 is a single type element, 5 is a case cover, 6 is an air flow sensor, 6a showing the center of the air flow sensor 6. Reference numeral 7 is an inlet duct of the air cleaner case, 8 is a pre-clean room, and 9 is a post-clean room in the air cleaner case.

Figure 4:
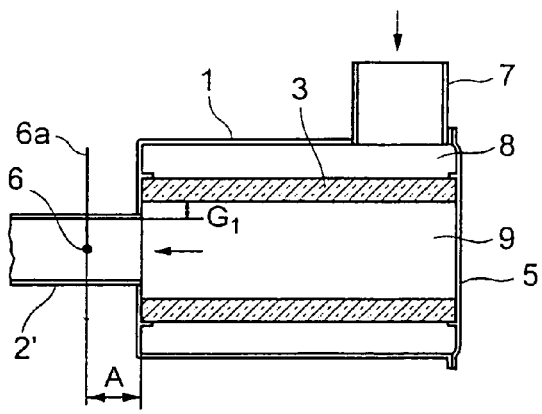
FIG. 4 is a schematic representation of the air cleaner of prior art when a single type element is inserted in the air cleaner.
Figure 5:
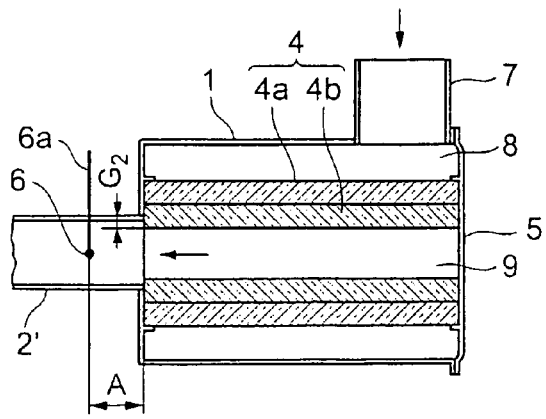
FIG. 5 is a schematic representation of the air cleaner of prior art when a double type element is inserted in the air cleaner.

The air cleaner of FIG. 1 is the same as that of prior art shown in FIG. 4 except that the outlet duct 2 is reduced in its diameter to be smaller than the diameter of the outlet duct 2' of the air cleaner of prior art and extended inward into the air cleaner case 1. Air sucked through the inlet duct 7 is introduced to the pre-clean room 8 and passes through the element 3 to enter the post-clean room 9. Then the air enters the outlet duct 2 from the opening 2a of the duct 2 in the air cleaner case 1 and flows passing by the flow sensor 6 toward an engine not shown in the drawing.

The outlet duct 2 extends into the air cleaner case 1 by length $L_D$. Therefore, the distance from the opening 2a of the duct 2 to the center 6a of the air flow sensor 6 is ($A+L_D$), thus the distance is increased by $L_D$ compared with distance A in the case of prior art as shown in FIG. 4. The turbulence in air flow generated at the opening 2a is weakened as the air flow proceeds through the distance of ($A+L_D$).

The length $L_D$ should be limited, because when said length $L_D$ is too large, the space between the outer surface of the part of the outlet duct 2 extending into the case 1 and the inner surface of the element 3 becomes a dead space and area effective for air to pass through the element 3 is reduced, which means the flow of air flowing from the pre-clean room 8 passing through the element 3 to the post-clean room 9 and then to the entrance 2a is affected.

FIG. 2 shows when a double type element is inserted in the air cleaner case. FIG. 2 is the same as FIG. 1 except that a double type element 4 is inserted in the air cleaner case 1 instead of the single type element 3. In FIG. 2, the same constituent part as that of FIG. 1 is indicated by the same reference number and explanation is omitted. The double type element 4 consists of an outer element 4a and inner element 4b. The inner diameter of the inner element 4b is about the same as the outer diameter of the outlet duct 2. Particularly, in this case, the flow of air passing through the element 4 to enter the post-clean room 9 is prevented in the part where the inner surface of the inner element 4b is covered by the outer surface of the outlet duct 2, and effective area of the element 4 for the air to pass through is reduced. Therefore, the length $L_D$ of the part extending into the air cleaner case 1 of the outlet duct 2 must be limited. It was found from results of several experiments that it is suitable that the ratio of length $L_D$ to axial length L of the element 3 or 4 is 0.1 to 0.25.

In FIG. 3 showing the control system of air supply and exhaust of an engine equipped with the air cleaner of the invention, reference numeral 31 is a cylinder, 32 is a piston, 33 is an exhaust turbocharger, 34 is an intake air intercooler, 35 is an EGR gas cooler, 36 is an EGR control valve, 37 is an EGR valve driving device, 38 is an intake manifold, 39 is an exhaust manifold, 40 is an air cleaner, 41 is an intake pipe, 42 is an exhaust pipe, 43 is an intake air temperature sensor, 44 is an intake air pressure sensor.

Said air cleaner 40 is the air cleaner consisting of the air cleaner case 1 and air cleaner element 3 or 4 shown in FIG. 1 or FIG. 2. Reference numeral 6 is an air flow sensor, and reference numeral 50 is a control unit. The output of the air flow sensor 6 is inputted to the control unit 50, which calculates the flow rate of intake air. To the control unit 50 are inputted the outputs of the intake temperature sensor 43 and intake pressure sensor 44. Also engine rotation speed and crank angles are inputted to the controller although not shown in the drawing. The control unit 50 calculates suitable EGR gas flow rate on the basis of the inputted data. The result of the calculation is sent as a signal to the EGR valve driving device 37 to adjust the amount of opening of the EGR valve 36.

According to the invention, intake air flow measurements fluctuating not widely can be obtained by using an air flow measuring device (including the air flow sensor and control unit inputted with the same calibration program) even when the air cleaner element differs according to the kind and use of the vehicle on which an automobile engine of the same type equipped with an air cleaner of the same design is mounted. Therefore, exhaust emission can be controlled while saving cost and contributing to facilitate parts management.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An air cleaner to clean the air taken into an engine, comprising:
   an air cleaner case formed to accommodate either a single air cleaner element or a double air cleaner element;
   an outlet duct having an inner diameter and an outer diameter, a portion of said outlet duct extending with said inner diameter inwardly into the air cleaner case to weaken turbulence in air flow at an air flow sensor located in a downstream zone of said outlet duct;
   said air cleaner when containing a single air cleaner element having a space between said outer diameter of said outlet duct extending portion and an inner diameter of said single air cleaner element; and
   said air cleaner when containing a double air cleaner element having an inner diameter substantially equal to said outer diameter of said outlet duct extending portion.

2. The air cleaner according to claim 1, wherein said outlet duct extends inwardly into said air cleaner case by a length of 10% to 25% of an inside length of the air cleaner case corresponding to an axial length of the air cleaner element inserted therein.

3. The air cleaner according to claim 1, wherein said single or double air cleaner element has an axial length substantially equal to a length of said air cleaner case.

4. The air cleaner according to claim 3, wherein a length of said outlet duct extending portion is about 10% to 25% of said axial length of the air cleaner element inserted in the air cleaner.

5. The air cleaner according to claim 1, further comprising an air flow measuring device for obtaining intake air flow measurements whether said air cleaner is equipped with a single air cleaner element or a double air cleaner element.

6. The air cleaner according to claim 5, wherein said air flow measuring device includes said air flow sensor and a control unit both inputted with a single calibration program.

\* \* \* \* \*